United States Patent [19]
Fujimoto et al.

[11] Patent Number: 5,346,176
[45] Date of Patent: Sep. 13, 1994

[54] SOLENOID VALVE

[75] Inventors: Akira Fujimoto; Takeshi Taniguchi, both of Miyazaki, Japan

[73] Assignee: Honda Lock Mfg. Co. Ltd., Miyazaki, Japan

[21] Appl. No.: 113,603

[22] Filed: Aug. 27, 1993

[51] Int. Cl.⁵ ............................................. F16K 31/06
[52] U.S. Cl. .......................... 251/129.15; 251/129.02; 137/454.2
[58] Field of Search .................. 251/129.15, 129.02; 137/454.2

[56] References Cited

U.S. PATENT DOCUMENTS 4,529,166 7/1985 Klausen et al. ................. 251/129.02
4,683,454 7/1987 Vollmer et al. ............. 251/129.15 X

FOREIGN PATENT DOCUMENTS 234875 3/1990 Japan.

*Primary Examiner*—Arnold Rosenthal
*Attorney, Agent, or Firm*—Longacre & White

[57] ABSTRACT

A solenoid valve has a first engaging hole at a lower end of a valve housing and a second engaging hole in an inner side of a closure. The valve structure permits the first end of a seal pipe to be pressed into the first engaging hole at the lower end of the valve housing and the second end of the seal pipe to be pressed into the second engaging hole in the inner side of the closure. The assembly can be performed in a single assembly action.

4 Claims, 3 Drawing Sheets

SOLENOID VALVE

BACKGROUND OF THE INVENTION

The present invention relates to a solenoid valve. Specifically, the present invention relates to a hydraulic solenoid valve to be used in an anti-lock brake system for vehicles.

Japanese Laid-Open Utility Model Publication No. HEI 2-34875 refers to a solenoid valve. This prior art consists of a bobbin with a wound coil disposed in a valve housing having a valve seat at the bottom, a movable pole piece having a valve member at the end face therein, and a spring which biases the movable pole piece in a seal pipe. A closure is placed at the open end of the valve housing.

The disadvantage of the prior art is that the solenoid valve is difficult to assemble. For example, two steps are required to assemble the seal pipe and insert it in the valve housing. First, a fixed core (or vane stopper), which is mounted on the cover, must be pressed onto one end of the seal pipe. Second, the other end of the seal pipe is pressed into an engaging hole at the lower part of the valve housing.

Because two pressing steps are required to set both ends of the seal pipe, the solenoid valve takes longer to assemble, thereby increasing production and manufacturing costs.

Attaching the closure to one end of the seal pipe is difficult in the prior art, because the movable pole piece easily falls out of the other open end when the valve housing is being set. Therefore, additional steps are required while assembling the valve in order to keep the movable pole piece from falling out.

OBJECTS AND SUMMARY OF THE INVENTION

It is accordingly an object of the present invention to overcome the drawbacks of the prior art. It is a further object of the present invention to provide a solenoid valve that has a simple structure.

It is a still further object of the present invention to provide an improved method to assemble a solenoid valve that is easier and more efficient than the prior art.

The present invention is an improved structure of a solenoid valve with the following parts. A bobbin with a wound coil is contained in a valve housing. The valve housing has a valve seat at the bottom end. A seal pipe, inserted into the center hole of the bobbin, contains a movable pole piece having a valve member at the end face and a spring which biases the movable pole piece in the seal pipe. A closure is attached to the top end of the valve housing. A first engaging hole provided in the lower part of the valve housing is concentric with the center hole of the bobbin. A second engaging hole is also provided in the inner side of the closure, having a bore concentric with the center hole of the bobbin. The structure of the two engaging holes enables both ends of the seal pipe to be pressed into the first and second engaging holes.

According to the present invention, the method of assembling a solenoid valve is simplified. A bobbin with a wound coil is set in the valve housing. The seal pipe is inserted into the center hole of the bobbin and then the movable pole piece and the spring to bias it are pressed in the pipe. The closure is placed on the upper end of the valve housing. In one movement, a first end of the seal pipe is pressed into the first engaging hole at the lower part of the valve housing, and the second end of the seal pipe is pressed into the second engaging hole on the inner side of the closure.

Briefly stated, the present invention provides a solenoid vane having a first engaging hole at a lower part of a valve housing and a second engaging hole on an inner side of a closure. The valve structure permits the first end of a seal pipe to be pressed into the first engaging hole at the lower part of the vane housing and the second end of the seal pipe to be pressed into the second engaging hole on the inner side of the closure. The assembly can be performed in a single assembly action.

According to an embodiment of the invention, there is provided a solenoid operated valve comprising: a vane housing, the vane housing having a closure for an upper end opening thereof and having a first engaging hole in a lower end thereof, the first engaging hole continuing to a bobbin center hole, the closure having a second engaging hole on an inner side thereof, a valve seat at a bottom of the valve housing, a seal pipe inserted into the bobbin center hole, a movable pole piece having a valve member at an end face therein, a spring for biasing the movable pole piece in the seal pipe, a structure enabling a first end and a second end of the seal pipe to be pressed in the first and second engaging holes, respectively, and a bobbin having a coil wound thereon set inside the valve housing.

According to a feature of the invention, there is provided a method of assembling a solenoid operated valve comprising the steps of: mounting a valve seat in a valve seat hole of a valve housing through a lower end thereof, inserting a bobbin in a bobbin hole of the vane housing, the bobbin hole communicating with the vane seat hole, inserting a seal pipe into a center hole of the bobbin, inserting a spring into the seal pipe, inserting a movable pole piece having a valve member at an end face therein into the seal pipe after inserting the spring, placing a closure over the bobbin hole, and rigidly securing the closure over the bobbin hole, whereby elements therein are retained in place.

According to a further feature of the invention, there is provided a method of assembling a solenoid operated valve comprising the steps of: mounting a valve seat in a valve seat hole of a valve housing through an upper end thereof, inserting a bobbin into a bobbin hole of the valve housing, the bobbin hole communicating with the valve seat hole, inserting a seal pipe into a center hole of the bobbin, inserting a movable pole piece having a valve member at an end face therein into the seal pipe, inserting a spring into the seal pipe after inserting the movable pole piece, placing a closure over the bobbin hole, and rigidly securing the closure over the bobbin hole, whereby elements therein are retained in place.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
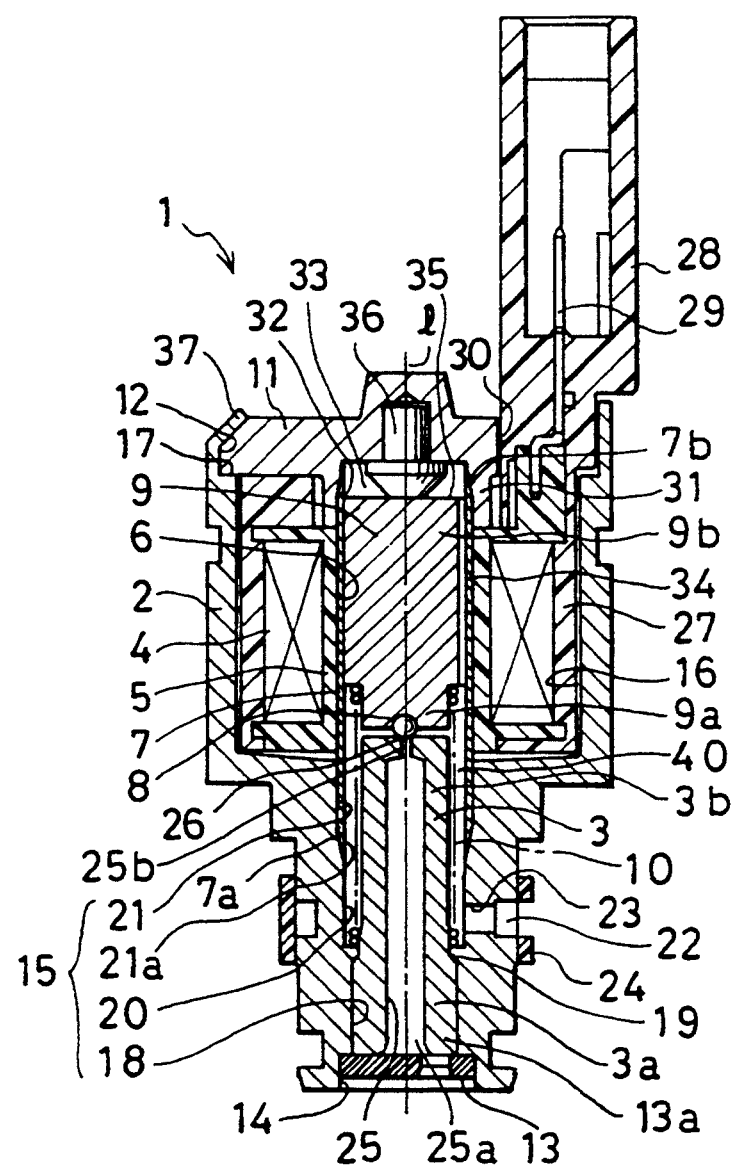
FIG. 1 is a cross-section of an embodiment of the present invention.
Figure 2:
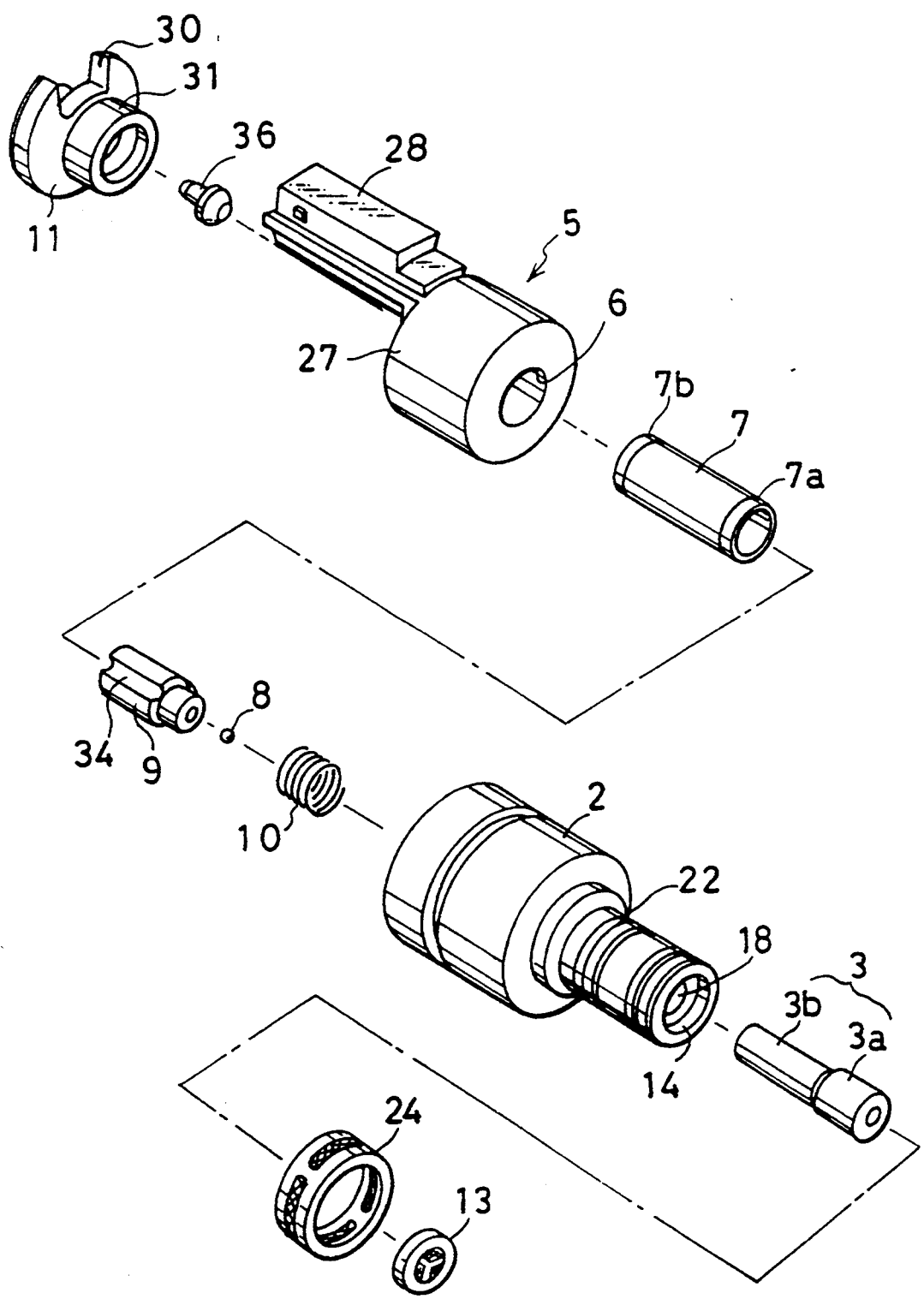
FIG. 2 is an exploded perspective diagram of the invention shown in FIG. 1.

Referring to FIGS. 1 and 2, a normally open type solenoid vane 1 includes a cylindrical vane housing 2 having a center hole passing centrally therethrough. A valve seat 3, which has a wide portion 3a and a narrow portion 3b, is attached to a bottom center of valve housing 2. A bobbin 5, on which is wound a coil 4, is disposed in an upper portion of valve housing 2. A seal pipe 7 is pressed in a bobbin center hole 6. Seal pipe 7 includes seal pipe ends 7a and 7b at opposed ends thereof. A movable pole piece 9 is positioned for free sliding motion in seal pipe 7. Movable pole piece 9 has a front narrow portion 9a and a rear wide portion 9b. Front narrow portion 9a faces the bottom of vane housing 2. A valve member 8 is centered before front narrow portion 9a. Rear wide portion 9b faces a top of vane housing 2.

A spring 10 in seal pipe 7 biases movable pole piece 9 away from valve seat 3. A closure 11 closes an upper end opening 12 of an upper end of valve housing 2.

Valve housing 2 has concentric cylindrical holes with different diameters. A hole 14 at a lower end of vane housing 2 accommodates a disc filter 13. A valve seat hole 15, above hole 14, accommodates vane seat 3. A bobbin hole 16 accommodates bobbin 5. Bobbin hole 16 has a substantially larger diameter than the remaining concentric cylindrical holes in valve housing 2. Upper end opening 12 of valve housing 2 is positioned adjacent bobbin center hole 6. Upper end opening 12 includes a step divider 17.

Valve seat hole 15 has holes of different diameters. A press hole 18 allows wide portion 3a of valve seat 3 to be pressed therein. A continued hole 20 has an inwardly facing flange 19 between continued hole 20 and press hole 18. Seal pipe end 7a of seal pipe 7 is pressed into a first engaging hole 21 in valve housing 2. Seal end 7b engages a second engaging hole 32 in a short cylindrical portion 31 of closure 11. Because of their tapered shape, seal ends 7a and 7b smoothly engage into engaging holes 21 and 32 and prevent undesirable deformation of seal ends 7a and 7b.

A lower portion 21a of first engaging hole 21 has a taper in which the diameter becomes smaller toward the bottom of valve housing 2. Second engaging hole 32 provided in the inner side of closure 11 also has a taper in which the diameter becomes smaller toward the top of valve housing 2. This tapering structure in first engaging hole 21 and second engaging hole 32 provides better sealing due to the round peripheral contact between seal pipe ends 7a and 7b of seal pipe 7 and engaging holes 21 and 32 at the time of insertion.

Holes 14, 15, 16, 18, 20, 21, and upper end opening 12 are concentric on an axis "l" of valve housing 2. Continued hole 20 is connected to a concave annular groove 22, at the lower outer periphery of valve housing 2, through a side oil passage 23. An annular oil filter 24 is press-fitted over annular groove 22.

Valve seat 3 has an inner oil passage 25 with an inlet port 25a and valve member hole 25b. Oil passing to inlet port 25a is filtered by disc filter 13 pressed into disc filter hole 14. Valve member hole 25b has a smaller diameter than oil passage 25. A valve member seat 26 is adjacent to valve member hole 25b at the end face of narrow portion 3b. Narrow portion 3b of valve seat 3 extends in seal pipe 7 to bobbin center hole 6. An annular oil passage 40 is formed between an outer wall defined by valve seat hole 15 and seal pipe 7 and an inner wall defined by the peripheral surface of valve seat 3.

Narrow portion 3b of valve seat 3 in seal pipe 7 protrudes part way into bobbin center hole 6. When coil 4 is energized, valve seat 3 works as a fixed core to pull movable pole piece 9 against spring 10. This structure improves the efficiency of the magnetic pull force. When coil 4 is de-energized, spring 10 biases movable pole piece 9 away from valve member 8, thereby enabling oil to flow from inlet port 25a through oil passage 25, valve member hole 25b, annular oil passage 40, side oil passage 23 (with oil filter 24), and flow out of side oil passage 23 at the lower end of solenoid valve 1 and exit through oil filter 24. The fluid could also flow in the opposite direction, by entering through oil filter 24 and side oil passage 23 and exiting through inlet port 25a. Inlet port 25a and side oil passage 23 are close to each other.

Bobbin 5 and coil 4 are enclosed in a molded body which is integrally formed with a socket 28. A notch 30 in closure 11 permits socket 28 to extend through closure 11. Two terminals 29 (only one of which is shown in FIG. 1) in socket 28 are connected to coil 4. An external connection of energizing voltage is made to coil 4 from outside valve housing 2 through terminals 29 using a conventional plug (not shown).

Front narrow portion 9a of movable pole piece 9 has a smaller diameter and is narrower than rear wide portion 9b. Spring 10 is fitted in annular oil passage 40 biased between front narrow portion 9a and flange 19. Spring 10 biases movable pole piece 9 upward away from valve seat 3 to separate valve member 8 from valve member seat 26 when coil 4 is de-energized.

Movable pole piece 9 has a groove 34 (best seen in FIG. 2) in the axial direction along the entire length of the outer periphery of rear wide portion 9b of movable pole piece 9. This prevents oil from becoming trapped in a space 33 between an end face 35 of rear wide portion 9b of movable pole piece 9 and an inner face of closure 11. End face 35 of rear wide portion 9b contacts and is blocked by a valve stopper 36 facing inward from closure 11. The valve stroke of movable pole piece 9 is determined by the space between valve member 8 and valve member seat 26.

Referring to FIGS. 1 and 2, solenoid valve 1 is assembled as follows. Valve seat 3 is mounted from below into the bottom of valve housing 2. The integral subassembly consisting of bobbin 5, with coil 4 wound thereon, and socket 28 is mounted into bobbin hole 16 through upper end opening 12 of valve housing 2. Seal pipe 7 is inserted into bobbin center hole 6. Valve member 8 is placed on valve member seat 26. Spring 10 and movable pole piece 9 are inserted into seal pipe 7. Closure 11 is set in place at upper end opening 12, but is not pressed into place at this time. As closure 11 is set in place, seal end 7b of seal pipe 7 enters short cylindrical portion 31 of closure 11. The engagement between seal end 7b and short cylindrical portion 31 is slight, in order to permit smooth entry of seal pipe 7 into closure 11. Socket 28 extends through notch 30 outside valve housing 2. Closure 11 is pressed along axis "t" while raised edge 37 is turned or bent over as shown to fix closure 11 rigidly in place, and to retain the other elements in their final positions.

The structure and arrangement described above enable seal pipe ends 7a and 7b to be mounted and pressed into first engaging hole 21 and second engaging hole 32. The single pressing action of closure 11 completes the insertion of both seal pipe ends 7a and 7b and simplifies the assembly of solenoid valve 1.

Figure 3:
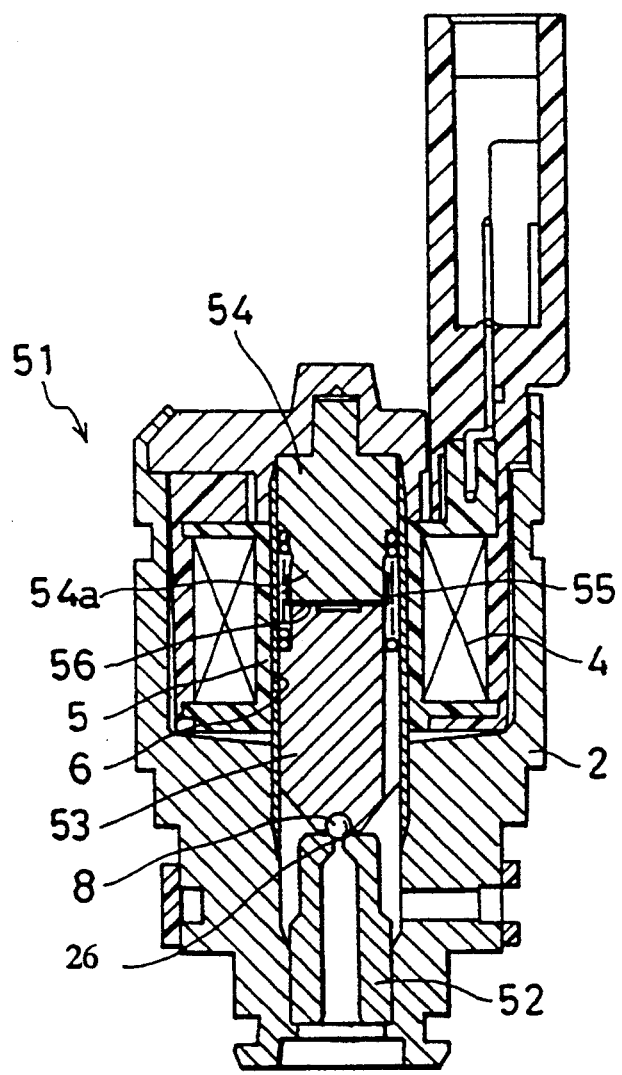
FIG. 3 is a cross-section of another embodiment of the present invention.

Referring to FIG. 3, a vertical cross-section of a normally closed type solenoid valve 51 differs from solenoid valve 1 of FIGS. 1 and 2 in that a spring 55 is biased between a shoulder on a valve stopper 54 and a shoulder on a movable pole piece 53. Spring 55 thus biases movable pole piece 53 into normally closed contact with a valve seat 52.

Valve member seat 26 in valve seat 52 accommodates valve member 8, as in the prior embodiment. Movable pole piece 53 includes a cone-shaped lower portion whose diameter becomes smaller as it approaches valve member 8. Valve stopper 54 has a lower end face 54a effective to pull movable pole piece 53 against spring 55 when coil 4 is energized.

The assembly sequence of normally closed solenoid valve 51 differs from assembly of normally open solenoid valve 1 in requiring introduction of valve seat 52 from above, and then following with the insertion of movable pole piece 53, spring 55, and then valve stopper 54. All other steps describing assembly of normally closed solenoid valve 51 are the same as the steps describing assembly of normally open solenoid valve 1, making assembly of this embodiment of the present invention equally as simple as assembly of the prior embodiment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A solenoid operated valve comprising:
   a valve housing;
   said valve housing having a closure for an upper end opening thereof and having a first engaging hole in a lower end thereof;
   said first engaging hole continuing to a bobbin center hole;
   said closure having a second engaging hole on an inner side thereof;
   a valve seat at a bottom of said valve housing;
   a seal pipe within said bobbin center hole
   a movable pole piece in said seal pipe, said movable pole piece having a valve member at an end face therein;
   means for biasing said movable pole piece in said seal pipe;
   a structure enabling a first end and a second end of said seal pipe to be pressed in said first and said second engaging holes, respectively;
   a bobbin set inside said valve housing, said bobbin having a coil wound thereon;
   said first engaging hole having a first taper therein;
   said second engaging hole having a second taper therein;
   a first tapered end of said seal pipe fits sealingly in said first taper; and
   a second tapered end of said seal pipe fits sealingly in said second taper.

2. A solenoid operated valve according to claim 1 further comprising:
   an inner oil passage in said valve seat;
   a side oil passage opened in a side wall of said lower end of said valve housing; and
   an annular groove formed between an inner wall and an outer wall;
   said inner wall defined by a peripheral surface of said valve seat;
   said outer wall defined by said valve seat hole and said seal pipe.

3. A method of assembling a normally open solenoid operated valve comprising the steps of:
   mounting a valve seat in a valve seat hole of a valve housing through a lower end of said valve housing;
   inserting a bobbin in a bobbin hole of said valve housing, said bobbin hole communicating with said valve seat hole;
   inserting a seal pipe into a center hole of said bobbin;
   inserting a spring into said seal pipe;
   after inserting said spring, inserting a movable pole piece having a valve member at an end face therein into said seal pipe;
   placing a closure over said bobbin hole; and
   rigidly securing said closure over said bobbin hole, whereby elements therein are retained in place.

4. A method of assembling a normally closed solenoid operated valve comprising the steps of:
   mounting a valve seat in a valve seat hole of a valve housing through an upper end of said valve housing;
   inserting a bobbin into a bobbin hole of said valve housing, said bobbin hole communicating with said valve seat hole;
   inserting a seal pipe into a center hole of said bobbin;
   inserting a movable pole piece having a valve member at an end face therein into said seal pipe;
   after inserting said movable pole piece, inserting a spring into said seal pipe;
   placing a closure over said bobbin hole; and
   rigidly securing said closure over said bobbin hole, whereby elements therein are retained in place.

* * * * *